Feb. 19, 1952  H. J. JEZEK  2,586,051
FRONT TRACTOR TIRE
Filed Oct. 21, 1947
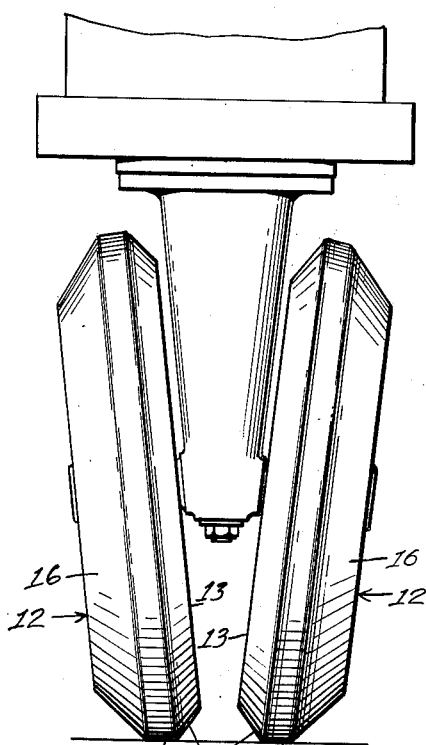
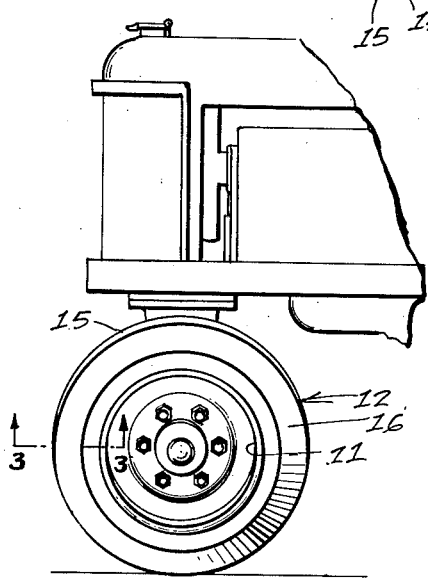
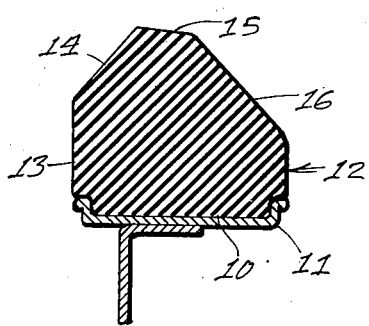
INVENTOR.
Henry J. Jezek
BY
Wilfred E. Lawson
Attorney Patented Feb. 19, 1952

2,586,051

UNITED STATES PATENT OFFICE 2,586,051

FRONT TRACTOR TIRE

Henry J. Jezek, Eddy, Tex.

Application October 21, 1947, Serial No. 781,144

2 Claims. (Cl. 152—323)

My invention relates to tractor tires and more particularly to tires for front wheels of tractors.

The object of my invention is to provide a tire especially adapted for use on front tractor wheels, arranged close together, so that the two front wheels of the tractor may travel between the rows of corn or other row crops.

Another object of my invention is to provide a tractor tire of the character indicated above having a contour adapted to facilitate the steering of a tractor equipped with such front wheel tires and saving wear on the steering mechanism and on the tires.

Other objects of my invention not specifically mentioned may appear in the following specification describing my invention with reference to the accompanying drawing illustrating a preferred embodiment of my invention. It is, however, to be understood that my invention is not to be limited or restricted to the exact construction and combination of parts described in the specification and shown in the drawing, but that such changes and modifications can be made, which fall within the scope of the claims appended hereto.

In the several figures of the drawing similar parts are designated with similar reference characters and Figure 1 is a view in front elevation illustrating tires constructed in accordance with an embodiment of the invention and in applied position;

Figure 2 is a view in side elevation on a reduced scale of the invention as illustrated in Figure 1; and Figure 3 is an enlarged detailed sectional view taken substatnially on the line 3—3 of Figure 2.

The tire forming the subject matter of my invention is preferably made from rubber and has a base portion 10 of any conventional shape and outline adapted to engage the rim 11 of a front wheel 12 of a tractor. As clearly shown in Figure 1, the front wheels 12 of the tractor are arranged on the tractor so that they are located closely together and slant downwardly toward each other in a well known manner preferred on tractors used mainly for work on row crops such as corn or the like.

From the base portion 10 the tire extends outwardly, so that the cross section thereof shows substantially an irregular V-shaped outline. The inside surface 13 of the tire, that is the surface adjacent to the tractor, extends from the base portion, so that said surface is arranged at a substantially right angle to the ground, when the tire is mounted on the wheel 12. The apex 14 of the V-shaped tire is flattened a little to form a narrow circumferential sole surface 15 adapted to engage the ground, when traveling over it. The outer surface 16 of the tire, that is the surface of the tire facing away from the tractor, slants outwardly and toward the axis of the tire from the outside edge of the circumferential sole surface 15.

Tires formed in this manner and mounted on the front wheels of row crop tractors will travel mainly on their narrow circumferential sole surface 15. When the ground, over which the tractor travels, is loosely packed, the tires sink somewhat into the ground, thereby forming narrow ruts, the outer side walls whereof exert an inwardly directed pressure against the outer surface 16 of the tire, so that the front wheels 12 of the tractor are urged to travel in straight forward direction between the rows of corn or the like facilitating the act of steering the tractor to keep the front wheels between the crop rows and thereby saving wear on the tires and on the parts of the steering mechanism and preventing damage to the young plants in the rows when cultivating the same. At the same time the resistance of the above described tires against the steering action, when executing a turn at the end of a crop row, will be hardly greater than the resistance of ordinary tires.

I claim:

1. A vehicle wheel tire of solid compressible material having a flat circumferential tread surface which is relatively narrow with respect to the width of the tire and which is formed nearer to one side of the tire than to the opposite thereof, the tire having an inclined wall extending from the said one side of the tire obliquely inward to the near side edge of said tread surface, and a relatively wider inclined wall extending from the said opposite side of the tire obliquely inward to the opposite side edge of said tread surface.

2. A vehicle tire of the character described in claim 1, wherein said tread surface across its width is at an angle less than a right angle with respect to the rotational axis of the tire.

HENRY J. JEZEK.

REFERENCES CITED

The following references are of record in the file of this patent:

UNITED STATES PATENTS

| Number | Name | Date |
|---|---|---|
| 452,001 | Yagn | May 12, 1891 |
| 2,281,359 | Kenner | Apr. 28, 1942 |
| 2,340,258 | Brunner | Jan. 25, 1944 |

FOREIGN PATENTS

| Number | Country | Date |
|---|---|---|
| 818,460 | France | June 21, 1937 |
| 551,543 | Great Britain | Feb. 26, 1943 |